(12) United States Patent
Dauscher et al.

(10) Patent No.: US 12,055,155 B2
(45) Date of Patent: Aug. 6, 2024

(54) COMPRESSOR

(71) Applicant: BorgWarner Inc., Auburn Hills, MI (US)

(72) Inventors: Sebastian Dauscher, Ludwigsburg (DE); Dietmar Metz, Ludwigsburg (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/833,584

(22) Filed: Jun. 6, 2022

(65) Prior Publication Data
US 2023/0374997 A1 Nov. 23, 2023

(30) Foreign Application Priority Data
May 17, 2022 (DE) ............... 20 2022 102 710.2

(51) Int. Cl.
| | |
|---|---|
| *F04D 29/056* | (2006.01) |
| *F01D 15/10* | (2006.01) |
| *F02B 37/10* | (2006.01) |
| *F02B 39/10* | (2006.01) |
| *F04D 25/06* | (2006.01) |
| *F04D 29/043* | (2006.01) |
| *F04D 29/046* | (2006.01) |
| *F04D 29/28* | (2006.01) |

(52) U.S. Cl.
CPC .......... *F04D 29/056* (2013.01); *F01D 15/10* (2013.01); *F02B 37/10* (2013.01); *F02B 39/10* (2013.01); *F04D 25/06* (2013.01); *F04D 29/043* (2013.01); *F04D 29/046* (2013.01); *F04D 29/284* (2013.01); *F05D 2220/40* (2013.01); *F16C 2360/24* (2013.01)

(58) Field of Classification Search
CPC ...... F05D 2220/40; F02B 39/10; F02B 37/10; F04D 25/06; F04D 29/284; F04D 29/056; F04D 29/043; F04D 29/046; F16C 2360/24; F01D 15/10
See application file for complete search history.

(56) References Cited

U.S. PATENT DOCUMENTS

| | | | |
|---|---|---|---|
| 9,394,945 B2 * | 7/2016 | Metz | F16C 43/02 |
| 9,964,026 B2 | 5/2018 | Schumnig et al. | |
| 10,069,154 B2 | 9/2018 | Metz et al. | |
| 10,724,544 B2 * | 7/2020 | Graham | F04D 29/284 |
| 2014/0185969 A1 | 7/2014 | Metz et al. | |
| 2014/0186745 A1 | 7/2014 | Metz et al. | |

FOREIGN PATENT DOCUMENTS

| | | |
|---|---|---|
| DE | 11 2012 002 973 T5 | 3/2014 |
| DE | 11 2012 002 901 T5 | 4/2014 |
| WO | WO 2013/165718 A1 | 11/2013 |

* cited by examiner

Primary Examiner — Peter J Bertheaud
(74) Attorney, Agent, or Firm — Bose McKinney & Evans LLP

(57) ABSTRACT

Disclosed is a compressor. The compressor has a shaft with a compressor wheel attached to the shaft. The compressor also as an electric motor configured to drive the shaft, and also has an axial air bearing having a spring plate and a cover plate that are attached to a carrier with clips. The clips may be provided as sheet metal strips having a bent end section that is bent over by more than 90° in the shape of a hook.

11 Claims, 3 Drawing Sheets

COMPRESSOR

RELATED APPLICATIONS

This application claims priority to DE 20 2022 102 710.2, filed May 17, 2022, the entire disclosure of which is hereby incorporated herein by reference.

BACKGROUND

This disclosure relates to a compressor generally of the type known from, for example, DE 11 2012 002 901 T5. Compressors of this type are required, for example, for the efficient operation of fuel cells, to which compressed air must be supplied.

A compressor is a device for the compression of gases. Compressors have a compressor wheel, which is driven via a shaft by an electric motor that has a rotor and a stator. Compressors may also comprise other parts, in particular, a turbine. The rotating assembly formed by the compressor wheel, shaft and the rotor of the electric motor, as well as possibly other parts, is axially supported by an axial air bearing. Axial air bearings have proven their worth in compressors because they combine the advantage of a long service life with very low friction.

Axial air bearings generally have a spring plate and a cover plate bearing against it. In the idle state, the cover plate bears against a collar or an annular disk of the supported shaft. When the supported shaft rotates, an air cushion is formed over the cover plate, by way of which the shaft collar or the annular disk of the shaft is supported. Axial air bearings of this type are described, for example, in DE 11 2012 002 973 T5.

SUMMARY

This disclosure demonstrates a way in which such a compressor with an axial air bearing can be manufactured more cost-effectively.

In a compressor according to this disclosure, the spring plate and the cover plate are fastened to a carrier with clips. In comparison to conventional attachment by welding or screwing, the manufacturing effort can be reduced in this way.

As a spring clip, the clip can produce a force-fit, or also a form-fit, connection. If the clip has a springily compressible end section, which is inserted into a cylindrical hole of the carrier, a pure force-fit connection is created, in that the end section presses against an inner surface of the hole. If the hole widens in the direction of insertion of the clip, for example if it is executed as a stepped hole, a form-fit connection can also be achieved.

In an advantageous refinement of this disclosure, provision is made for the clip to be designed as a sheet metal strip with a bent end section; it has, for example, a hook-shaped bent end section. By inserting the end section into an opening of the carrier, an attachment of the spring plate and cover plate to the carrier can be achieved with little assembly effort.

The clip can be designed as a separate component, or it can be designed in one piece with the spring plate or the cover plate. A strip-shaped section that forms the clip can be provided on the spring plate or the cover plate with little effort.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

Figure 1:
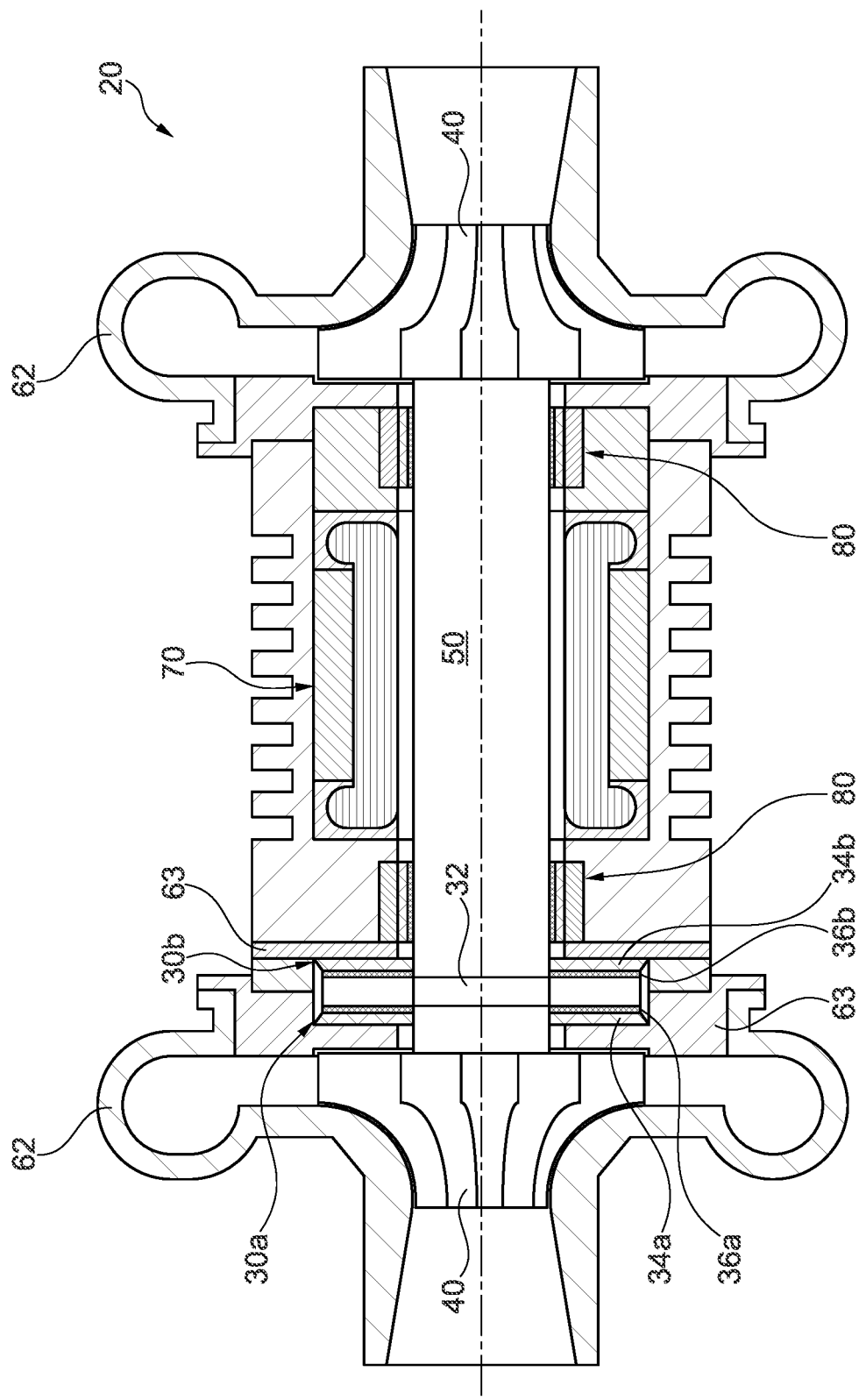
FIG. 1 shows a schematic representation of a compressor.

FIG. 1 shows schematically a compressor 20, which has a housing 62, in which a compressor wheel 40, a shaft 50 to which the compressor wheel 40 is attached, and an electric motor 70 driving the shaft 50, are arranged. The compressor shown includes two compressor wheels 40, which are coupled to the shaft 50; however, the example of embodiment can also be modified such that the compressor only has a single compressor wheel 40.

The shaft 50 is supported on radial bearings 80, for example radial air bearings, and axial air bearings 30a, 30b on an annular disk 32 attached to the shaft 50. The axial air bearings 30a, 30b are formed by spring plates 34a, 34b and cover plates 36a, 36b. The cover plates 36a, 36b in each case face towards the annular disk 32, and are supported on their sides facing away from the annular disk 32 by spring plates 34a, 34b. The cover plates 36a, 36b and the associated spring plates 34a, 34b are in each case attached to a carrier 63.

Figure 2:
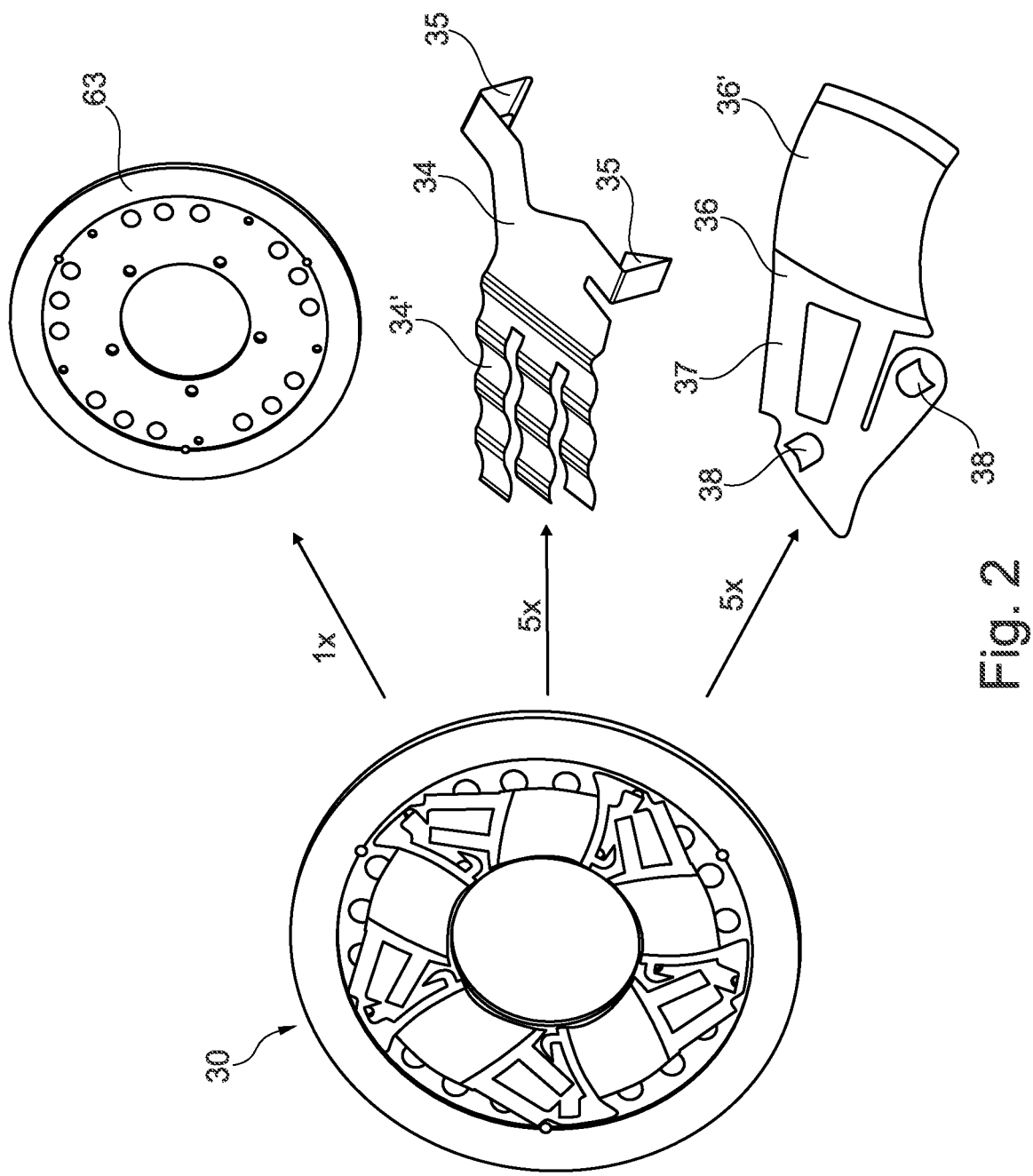
FIG. 2 shows an axial air bearing, together with an exploded view of the axial air bearing.

FIG. 2 shows schematically such an axial air bearing 30 with a carrier 63, together with spring plates 34 and cover plates 36 in the assembled state, and also as an exploded view. In this example of embodiment, a plurality of cover plates 36 are arranged next to one another on the carrier 63, each being supported by its own spring plate 34. In a modified example of embodiment, the individual cover plates 36 can be combined into a single cover plate, and the individual spring plates 34 can be combined into a single spring plate.

The cover plates 36 carry a coating 36' on a side facing away from the associated spring plate 34. When the shaft 50 is not rotating, the cover plates 36 with the coating 36', which is, for example, made of Teflon, bear against the annular disk 32 of the shaft 50. The spring plates 36 have tabs 37, which may be free of the coating 36'. The tabs 37 serve to provide the attachment to the carrier 63, and have openings 38 for this purpose.

The spring plates 34 have corrugated spring sections 34', against which the cover plates 36 bear, and a clip 35, which is designed as a sheet metal strip with a bent end section. In the assembled state, the clip 35 protrudes through an opening 38 in the associated cover plate 36, and engages with a hole in the carrier 63. The clip 35 can also be designed as a separate component, for example as a sheet metal strip which is bent over at both ends in the shape of a hook, and is inserted, through suitable openings in the tabs of a spring plate and a cover plate, into holes in the carrier 63.

Figure 3:
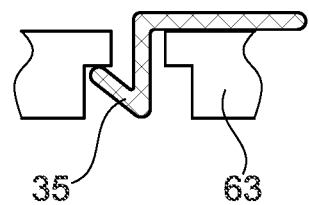
FIG. 3 shows a detailed view of a further example of embodiment.
Figure 4:
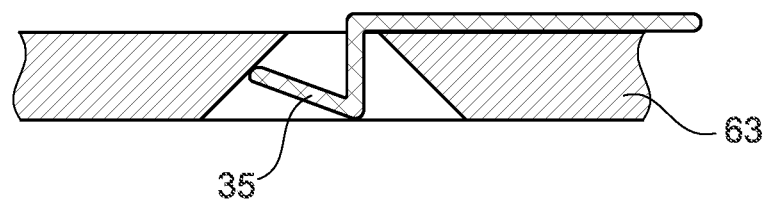
FIG. 4 shows a detailed view of a further example of embodiment.
Figure 5:
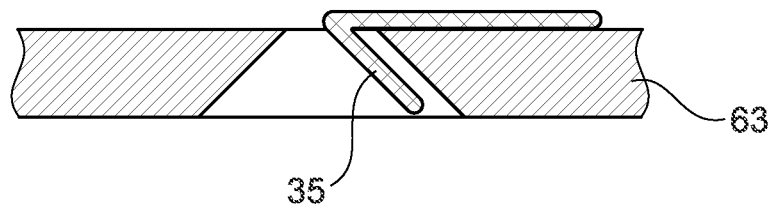
FIG. 5 shows a detailed view of a further example of embodiment.

The holes in the carrier 63 can be executed as cylindrical holes. The clip 35 then presses springily against an inner surface of the hole and produces a pure force-fit connection. A more reliable connection can be achieved by widening the hole of the carrier 63 in the direction of insertion, that is to say, it has a smaller width at its end facing towards the cover plate 36 than at its end facing away from the cover plate 36. In this way, a form fit can also be achieved. FIGS. 3 to 5 show schematically such examples of embodiment.

FIG. 3 shows schematically an example of embodiment in which the hole in the carrier 63 is executed as a stepped hole. The clip 35, which is designed as a sheet metal strip with a bent end section, produces a form fit. When the clip 35 is inserted into the hole, the hook-shaped bent end section is first compressed and then springs open into the configuration shown in FIG. 3.

FIG. 4 shows schematically a further example of embodiment, in which the hole in the carrier 63 is executed as a conical hole. The clip 35, which is designed as a sheet metal strip with a bent end section, here too produces a form fit. When the clip 35 is inserted into the hole, the hook-shaped bent end section is first compressed and then springs open into the configuration shown in FIG. 4.

FIG. 5 shows schematically another example of embodiment, in which the hole in the carrier 63 is executed as a conical hole. In contrast to the example of FIG. 4, the end section is bent towards the other side. In each of the examples of FIGS. 3 to 5, the end section is bent by more than 90° from an adjacent section of the sheet metal strip, so that the clip 35 produces a form fit in the opening of the carrier 63, which widens in the direction of insertion.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SYMBOLS

- 30 Axial air bearing
- 30a Axial air bearing
- 39b Axial air bearing
- 32 Annular disk
- 34 Spring plate
- 34a Spring plate
- 34b Spring plate
- 35 Clip
- 36 Cover plate
- 36a Cover plate
- 36b Cover plate
- 37 Tab
- 38 Opening
- 40 Compressor wheel
- 50 Shaft
- 62 Housing
- 63 Carrier
- 70 Electric motor
- 80 Radial bearing

What is claimed is:

1. A compressor, comprising:
    a shaft;
    a compressor wheel attached to the shaft;
    an electric motor configured to drive the shaft; and
    an axial air bearing supporting the shaft, the axial air bearing having a spring plate and a cover plate that are axially attached to a carrier with clips wherein the clips extend axially.

2. The compressor according to claim 1, wherein the clip is integrally formed with the spring plate or the cover plate.

3. The compressor according to claim 1, wherein each of the clips engages with an opening of the carrier, the opening widening in the direction of insertion of the clip.

4. The compressor according to claim 3, wherein the opening is a stepped hole or a conical hole.

5. The compressor according to claim 1 wherein the axial air bearing comprises a plurality of spring plates arranged next to one another, each said spring plate provided with a separate cover plate.

6. A compressor, comprising:
    a shaft;
    a compressor wheel attached to the shaft;
    an electric motor configured to drive the shaft; and
    an axial air bearing supporting the shaft, the axial air bearing having a spring plate and a cover plate that are attached to a carrier with clips wherein the clips comprise sheet metal strips having a bent end section.

7. The compressor according to claim 6, wherein the end section is bent over by more than 90° in the shape of a hook.

8. The compressor according to claim 6 wherein the sheet metal strips extend axially.

9. A compressor, comprising:
    a shaft;
    a compressor wheel attached to the shaft;
    an electric motor configured to drive the shaft;
    an axial air bearing supporting the shaft, the axial air bearing having a spring plate and a cover plate that are attached to a carrier with clips; and wherein the cover plate has tabs which have an opening through which the clips engage.

10. The compressor according to claim 9, wherein the cover plate carries a coating on a side facing away from the spring plate and a distal end section of the lugs is free of the coating.

11. The compressor according to claim 9 wherein the clips extend axially.

* * * * *